United States Patent [19]

Neuerburg

[11] Patent Number: 4,922,693
[45] Date of Patent: May 8, 1990

[54] MOWER EQUIPPED WITH A CUTTING BAR

[75] Inventor: Horst Neuerburg, Saverne, France

[73] Assignee: Kuhn S.A., Saverne, France

[21] Appl. No.: 299,450

[22] Filed: Jan. 23, 1989

[30] Foreign Application Priority Data

Jan. 22, 1988 [FR] France .................................. 88 00901

[51] Int. Cl.$^5$ ...................... A01D 34/66; A01D 34/76
[52] U.S. Cl. ...................................... 56/13.6; 56/255; 56/320.1
[58] Field of Search .................... 56/6, 13.6, 234, 255, 56/320.1, DIG. 6, DIG. 9; 411/90, 87, 92–97, 400, 169, 972

[56] References Cited

U.S. PATENT DOCUMENTS

| 593,505 | 11/1897 | Zern et al. | 411/87 |
|---|---|---|---|
| 2,568,928 | 9/1951 | Nordenson et al. | 411/92 |
| 4,466,234 | 8/1984 | Sasaki | 56/13.6 |
| 4,740,124 | 4/1988 | Pearson et al. | 411/90 |
| 4,761,940 | 8/1988 | Wolff | 56/13.6 |

FOREIGN PATENT DOCUMENTS

| 0110812 | 6/1984 | European Pat. Off. | |
| 0240084 | 10/1987 | European Pat. Off. | |
| 0240086 | 10/1987 | European Pat. Off. | |
| 1147813 | 4/1969 | United Kingdom . | |
| 2002622 | 3/1979 | United Kingdom . | |
| 2068703 | 8/1981 | United Kingdom . | |
| 2089636 | 6/1982 | United Kingdom . | |
| 2126067 | 3/1984 | United Kingdom | 56/13.6 |

Primary Examiner—Bruce M. Kisliuk
Attorney, Agent, or Firm—Oblon, Spivak, McClelland, Maier & Neustadt

[57] ABSTRACT

A mower including a housing and an assembly for fastening guiding and driving bearings to an upper part of the housing. The assembly includes plural bolts each fastened to a holding element which holds each bolt approximately in its appropriate position and which prevents rotation of each bolt during the tightening or loosening of the nut. The bolt and its holding element constitute a removable assembly.

34 Claims, 3 Drawing Sheets

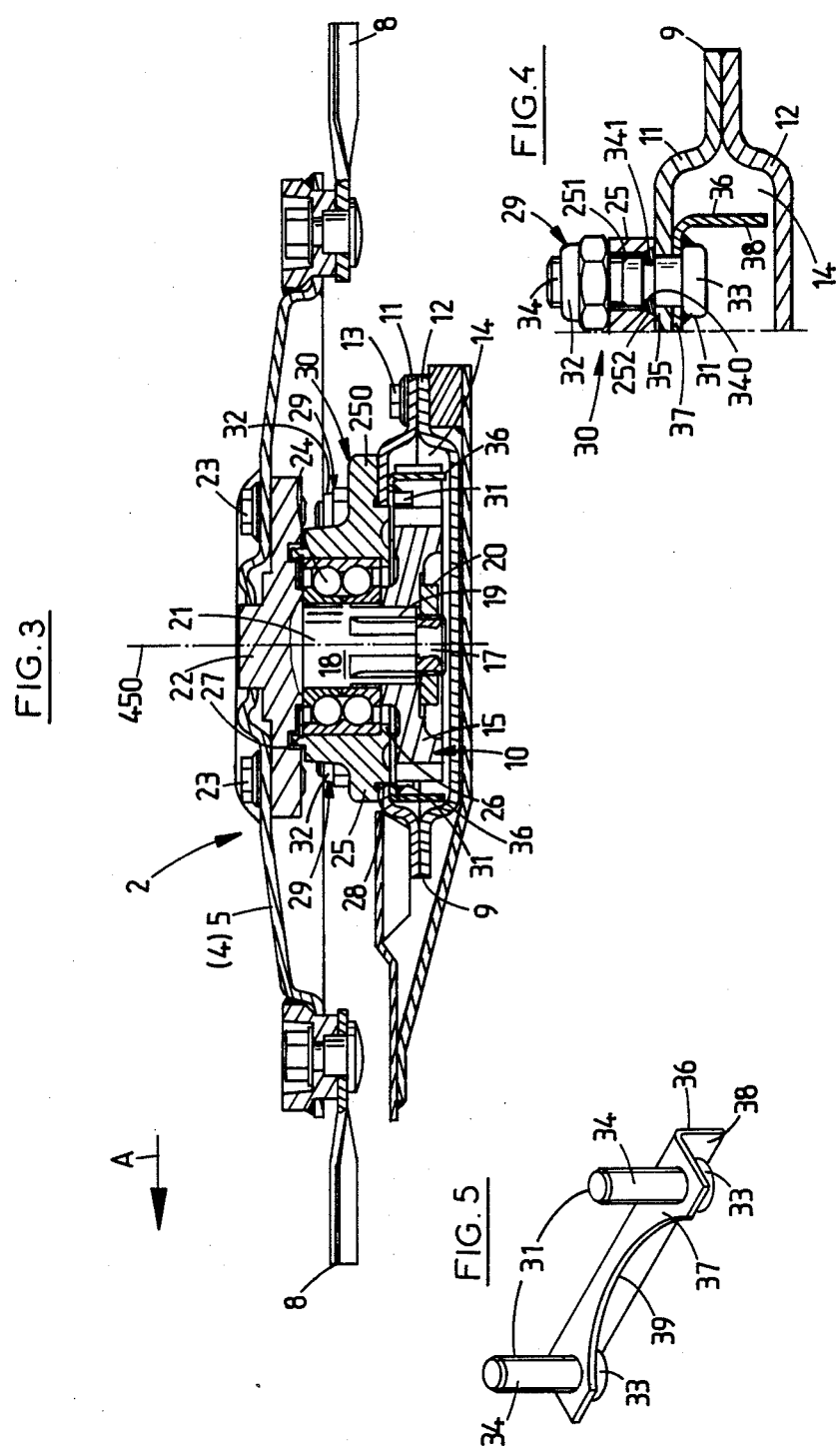

MOWER EQUIPPED WITH A CUTTING BAR

BACKGROUND OF THE INVENTION

Field of the Invention

This invention relates to a mower equipped with a cutting bar and having cutting elements extending above a housing, each of the cutting elements being guided and driven in rotation around an axis directed upward by a guiding and driving bearing which includes a casing centered in a corresponding bore made in the upper part of the housing, a guiding bearing mounted in said casing and a shaft guided in said casing with the help of the guiding bearing, said shaft being equipped at its upper end with a fastening part for fastening a corresponding cutting element and at its lower end with a second gear extending inside the housing and meshing with at least one first gear also housed inside said housing, said second gear having an outside diameter which is less than the diameter of the corresponding bore made in the upper part of the housing, each of said guiding and driving bearings being fastened to the upper part of the housing by bolts the shanks of which extend out of the upper part of the housing and nuts screwed on said shanks, said housing being formed by said upper part and a corresponding lower part assembled in a removable way by assembly members.

Discussion of the Background

A mower is known wherein the bolts fastening the guiding and driving bearings to the upper part of the housing, have their heads extending inside said housing and their shanks extending upward while passing through corresponding holes provided in said upper part. Since the bolt is not held in rotation, in order to change a guiding and driving bearing, it is necessary to remove the lower part of the housing to lock the rotation of the bolts, to be able to loosen and then tighten the nuts screwed on the shank of the corresponding bolts. It is understood that this operation can be performed only in a workshop, especially since in general the housing contains a lubricant in which the gears driving the cutting elements in rotation are bathed. This operation will therefore immobilize the machine for a relatively long time at a time precisely when the user has a pressing need for it.

It can then be conceived to fasten the bolts rigidly to the upper part of the housing by welding, for example. This solution, however, is not good for several reasons. A first reason is that the sheet metal constituting the upper part of the housing can be deformed during welding, so that after welding, the shanks of the bolts are not parallel to one another, which will pose problems in having them pass through the passage holes made in the casing of the corresponding guiding and driving bearing. A second reason is that, considering the length of the upper parts of the housing, their manipulation for welding of the bolts is not easy. A third reason is that the shanks of the bolts which extend outside the upper part of the housing can be seriously damaged at the building site or at the dealer's location during storage or handling of the upper part before mounting. In this case, it will be impossible to screw the corresponding nuts on the damaged shanks.

SUMMARY OF THE INVENTION

The object of this invention is to propose a solution that does not have the drawbacks of the prior devices.

For this purpose, the mower according to the invention is characterized by the fact that each bolt fastening the guiding and driving bearings to the upper part of the housing is fastened to a holding element which holds said bolt approximately in the appropriate or desired position and which prevents rotation of said bolt during tightening or loosening of the corresponding nut, said bolt and its holding element constituting a removable assembly.

Thanks to this characteristic, the bolts being used to fasten the guiding and driving bearings to the upper part of the housing will be mounted only at the moment of mounting the cutting bar. Consequently, these bolts cannot be damaged during storage or handling of the upper parts of the housing. It is then possible to loosen and tighten the nuts screwed on these bolts without it being necessary to remove the lower part of the housing because the holding element prevents rotation of the corresponding bolt. In addition, the holding element holds the corresponding bolt approximately in its appropriate position so that the bolt is not in danger of falling into the housing when the corresponding guiding and driving bearing has been removed. Consequently, it is possible for the user to himself change a defective guiding and driving bearing without the machine having to be taken to a workshop so that in case of breakdown of a guiding and driving bearing, the machine will be able to be repaired very quickly. Considering the fact that the bolt and its holding element constitute a removable assembly, it will be possible to change this assembly if the bolt were to become defective.

According to an additional characteristic of the invention, the holding element holds the corresponding bolt approximately in the desired position after mounting of the lower part of the housing on the upper part of said housing. This characteristic particularly allows for the advantage of not increasing the thickness of the housing, although the holding element extends inside the housing.

According to a further characteristic, each holding element is equipped with several bolts.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 3 represents on a larger scale a view in section taken along line III—III (FIG. 1) of the cutting bar;

FIG. 4 represents a view in section along line IV—IV defined in FIG. 2; and

FIG. 5 represents a view in perspective of a holding element equipped with two bolts.

DESCRIPTION OF THE PREFERRED EMBODIMENT

Figure 1:
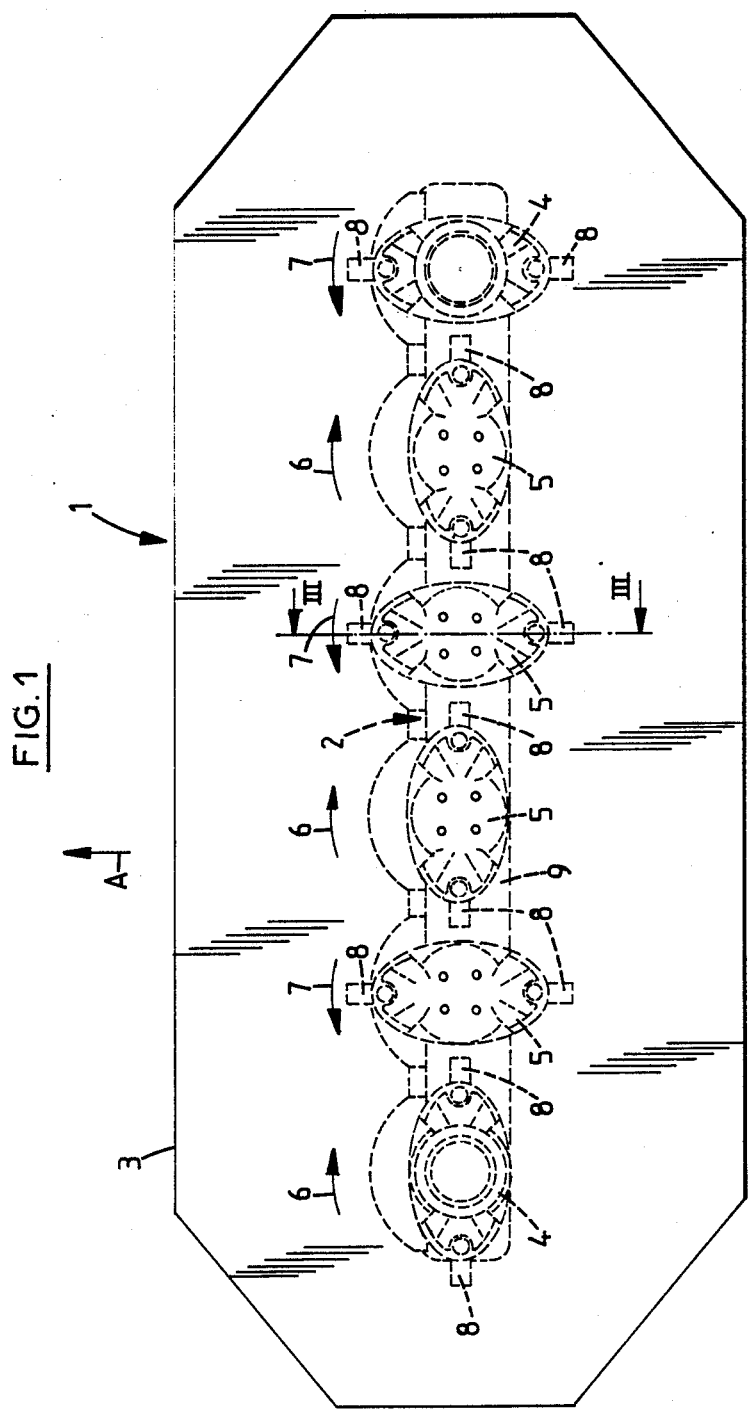
FIG. 1 represents a top view of a mower according to the present invention.

A mower 1 is shown in FIG. 1 which comprises a cutting bar 2 extending in a known manner under a protective device 3. In this FIG., the device making it possible to connect said cutting bar 2 to a tractor vehicle has not been shown. These devices are actually within the scope of a person skilled in the art.

Cutting bar 2 comprises, as a nonlimiting example, six cutting elements 4, 5 each rotating around an axis 450 (see FIGS. 2 and 3) directed upward, for example in the directions 6, 7. Each cutting element 4, 5 is equipped with two blades 8 and extends above a housing 9 in which it is guided in rotation and which contains driving elements 10 (see FIGS. 2 and 3) intended to drive said cutting elements 4, 5 in rotation.

Figure 2:
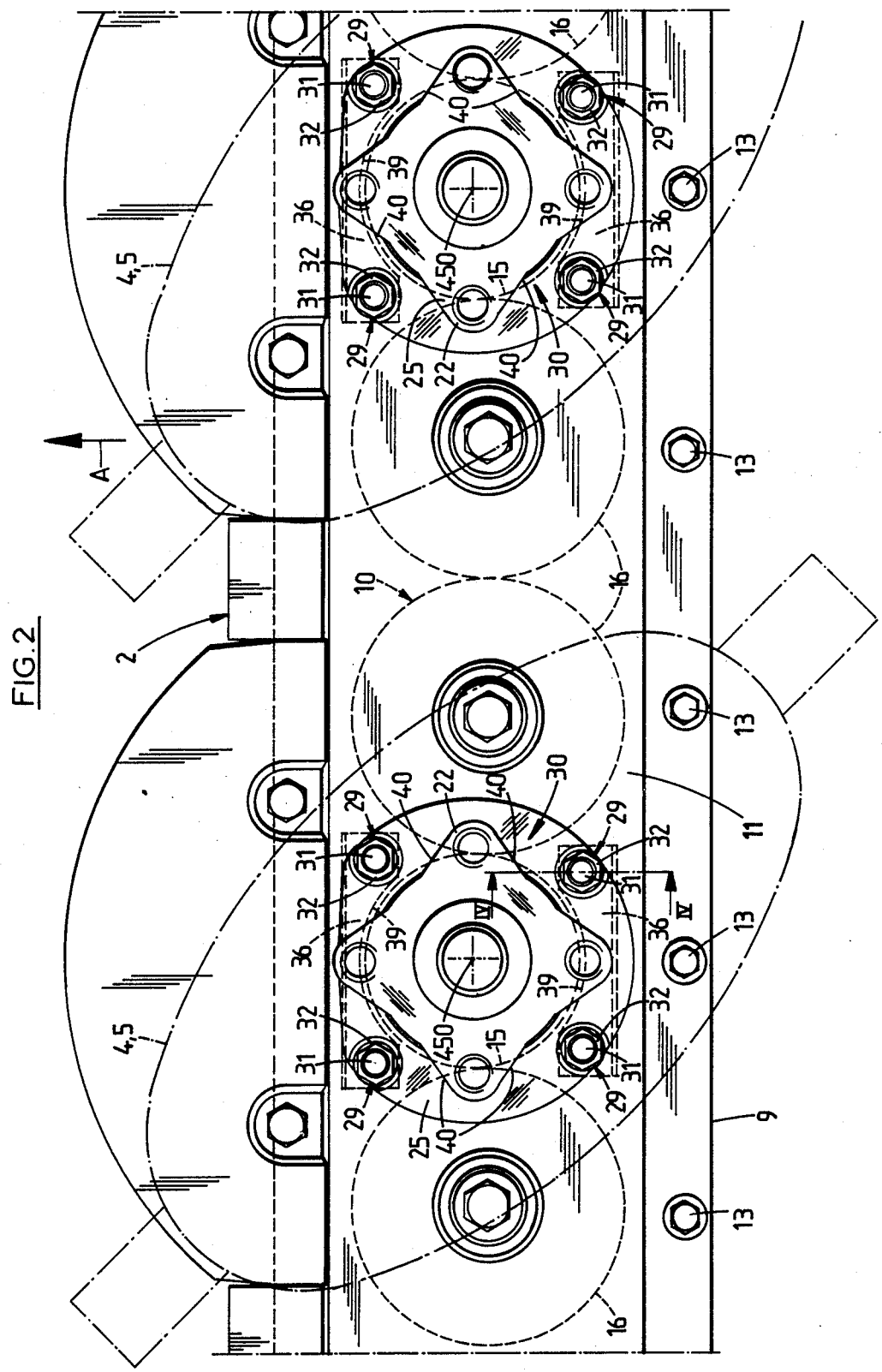
FIG. 2 represents a top view on a larger scale of the cutting bar of the mower of FIG. 1 without the cutting elements which have been shown only in dot-and-dash lines.

In FIGS. 2 and 3, it can be seen that housing 9 is formed by an upper part 11 and a lower part 12 which are connected to one another by assembly members 13. After assembly, both parts 11, 12 define an approximately parallelepiped space 14 which contains the driving elements 10. These driving elements 10, in the example shown, consist of a series of cylindrical gears 15 and intermediate cylindrical gears 16 meshing with one another and rotating in lubricant also housing 9. Each gear 15 is connected at lower end 17 of a shaft 18 by splines 19 and by a nut 20. At its upper end 21, shaft 18 is connected to a fastening part 22. This fastening part 22 makes it possible to fasten the corresponding cutting element 4, 5 to shaft 18 by bolts 23.

Shaft 18 is guided in rotation in a guiding bearing 24 which, in the example shown, consists of a two-row, angular-contact ball bearing. This guiding bearing 24 is itself mounted in a casing 25 and is connected at this location in translation by a shoulder 26 and a circlip 27. Casing 25 is centered in a corresponding bore 28 made in the upper part 11 of housing 9 and is fastened to said upper part 11 by assembly elements 29. The diameter of bore 28 is greater than the outside diameter of corresponding gear 15, but is smaller than the outside diameter of flange 250 of casing 25.

The unit, which includes a casing 25, guiding bearing 24, circlip 27 being used to connect this guiding bearing 24 to casing 25, shaft 18, fastening part 22, gear 15 and nut 20 forms a guiding and driving bearing 30. Guiding and driving bearing 30 can be mounted or removed from housing 9 through the top since the outside diameter of gear 15 is smaller than the diameter of corresponding bore 28.

As can be seen in FIGS. 2 to 5, assembly elements 29 that are used to fasten a casing 25 to upper part 11 of housing 9 comprise, in particular, bolts 31 and nuts 32. In the example shown, each casing 25 is fastened by four bolt 31-nut 32 assemblies. Each bolt 31 has a head 33 which extends inside the parallelepiped space 14 and a shank 34 which extends out of upper part 11 of housing 9 by passing through a corresponding hole 35 provided for this purpose in upper part 11. To hold bolts 31 in their appropriate position, they are fastened in the example shown, by welding) to holding elements 36. In this example, each holding element 36 is equipped with two bolts 31 so that for each casing 25, there are two holding elements 36. Each holding element 36 consists of a bracket wherein one wing 37 thereof extends approximately horizontally and supports bolts 31 and the other wing 38 extends approximately vertically between upper part 11 and lower part 12 of housing 9. In FIGS. 3 and 4, it can be seen that the height of holding element 36, i.e., in the example shown, the length of vertical wing 38, is approximately equal to the inside thickness of housing 9. As stated, each holding element 36 is equipped with two bolts 31 and the fastening of each guiding and driving bearing 30 therefore requires two holding element 36-bolt 31 assemblies. In FIG. 2, it can be seen that these holding elements 36 extend approximately parallel to the longitudinal axis of housing 9, to make possible the meshing between corresponding gear 15 and neighboring intermediate gears 16. In addition, it is seen in FIGS. 2 and 5 that horizontal wing 37 of a holding element 36 comprises a circular recess 39 centered on the axis of rotation 450 of corresponding gear 15 and with a radius slightly larger than the radius of said gear 15.

Finally, in FIG. 4, it can again be seen that at the location where shank 34 of a bolt 31 extends out of upper part 11 of housing 9, shank 34 has an approximately semicircular groove 340 in which an O-ring 341 is mounted. At the same time, corresponding passage hole 251 provided in flange 250 of corresponding casing 25, includes, at the position where it extends out of the face of said flange 250 intended to come in contact with upper part 11 of housing 9, a beveled portion 252. Thus, during mounting of guiding and driving bearing 30 on upper part 11 of housing 9, O-ring 341 fills the space created between groove 340 and corresponding beveled portion 252 and thereby obtains a perfect seal preventing any leakage of lubricant contained in housing 9.

Mounting of cutting bar 2 which has just been described is performed in the following manner: the upper part 11 of housing 9 is placed upside down; the various intermediate gears 16 are mounted; the holding element 36-bolt 31 assemblies are put in place, i.e., shanks 34 of bolts 31 are introduced in corresponding holes 35 made in upper part 11; lower part 12 is placed on upper part 11 and these two parts are assembled with assembly members 13; and then the unit is turned over so that upper part 11 is now on top. In this position, bolts 31 will be held approximately in their desired position by corresponding holding elements 36, since said holding elements 36 have a height approximately equal to the inside thickness of housing 9. Then, previously preassembled guiding and driving bearings 30 are mounted and are fastened with nuts 32 that are screwed on shanks 34 of corresponding bolts 31. This is possible because during the tightening of a nut 32 on shank 34 of a bolt 31, the latter is prevented from rotation by corresponding holding element 36 and by the other bolt 31 with which this holding element 36 is also equipped. Finally, cutting elements 4, 5 are fastened to corresponding guiding and driving bearings 30 with bolts 23.

If during operation a guiding and driving bearing 30 becomes defective, the user will be able to himself change it very quickly without it being necessary to remove entirely cutting bar 2. The mower will therefore be able to be repaired in the field itself and at less cost.

To do this, it will actually suffice to remove cutting element 4, 5 corresponding to the defective guiding and driving bearing 30; remove the nuts 32; take out the defective guiding and driving bearing 30; mount a new guiding and driving bearing 30; screw the nuts 32 again on shanks 34 of corresponding bolts 31; and mount the corresponding cutting element 4, 5.

In FIG. 2, there can also be seen the shape of fastening part 22 of each guiding and driving bearing 30 making possible the fastening of corresponding cutting element 4, 5. This shape is such that nuts 32 being used for the fastening of a guiding and driving bearing 30 to upper part 11 of housing 9, are easily accessible from the top. This makes possible the use of motor-driven screwdrivers during mounting of the cutting bar 2 and, therefore, contributes to reducing the mounting costs. In the example shown, fastening part 22 comprises four flat surfaces 40 which impart to said fastening part 22 in a top view an approximately square general shape. This special shape makes possible simultaneous access to four nuts 32 so that it will be possible to use special screwdrivers with four tightening heads for a simultaneous tightening of four nuts 32.

Cutting bar 2 which has just been described above can be used in a standard mower, in a mower-windrower or in a mower conditioner.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mower equipped with a cutting bar, said cutting bar comprising:

an elongate housing having a longitudinal axis and adapted in a work position to extend close to a field surface so that said longitudinal axis extends transversely to a direction of work, said housing when in said work position having an upper part and a lower part, said upper part including a plurality of bores formed therein, and said housing containing first gears positioned therein;

a plurality of guiding and driving bearings;

a plurality of cutting elements extending, when said housing is in said work position, above said housing and at least a part of said plurality of cutting elements each being guided and driven in rotation about a corresponding axis directed upward by a corresponding one of said guiding and driving bearings, wherein each of said guiding and driving bearings comprises a casing centered in a corresponding one of said bores in said upper part of said housing, a guiding bearing mounted in said casing, a shaft guided in said casing via said guiding bearings, a fastening part for fastening the corresponding one of said at least one part of said plurality of cutting elements, said fastening part being connected to an upper end of said shaft, and a second gear connected to a lower end of said shaft, said second gear extending in said housing and meshing with at least a corresponding one of said first gears positioned in said housing, said second gear having an outside diameter less than a diameter of said corresponding bore formed in the upper part of said housing; and assembly elements for removably fastening said guiding and driving bearings to said upper part of said housing, said assembly elements including a plurality of fastening members each one of which having a threaded upper portion extending when said housing is in said work position above said upper part of said housing and a lower portion positioned entirely within said housing, a plurality of nuts each one of which being screwed on said threaded upper portion of the corresponding one of said fastening members, and one or several holding elements positioned entirely within said housing and to which are fastened said fastening members by their corresponding lower portion for holding each one of said fastening members in position and for preventing rotation of each one of said fastening members during tightening or loosening of the corresponding nut, said one or said several holding elements and said fastening members fastened thereto being removable from said housing.

2. A mower according to claim 1, wherein each of said fastening members comprises a bolt.

3. A mower according to claim 1, wherein said holding element or each one of said several holding elements holds the corresponding fastening member in position after mounting of said lower part of said housing to said upper part of said housing.

4. A mower according to claim 3, wherein a height dimension of said holding element or of each one of said several holding elements is approximately equal to an inside thickness dimension of said housing.

5. A mower according to claim 1, wherein each fastening member is fastened by welding to said holding element or to the corresponding one of said several holding elements.

6. A mower according to claim 1, wherein said holding element or each one of said several holding elements extends to a position in the vicinity of at least one of said second gears and includes a recessed portion so as to avoid interference with said at least one second gear.

7. A mower according to claim 6, wherein said recessed portion comprises at least one portion partly circular in shape which has a radius slightly larger than a radius of said second gear.

8. A mower according to claim 1, wherein each one of said several holding elements supports two fastening members and wherein to each guiding and driving bearing are associated two holding elements.

9. A mower according to claim 1, wherein said holding element or each one of said several holding elements extends approximately parallel to said longitudinal axis of said housing.

10. A mower according to claim 1, wherein said holding element or each one of said several holding elements comprises a bracket having a first and second wing portion, said first wing portion, during work when said housing extends close to a field surface, extending substantially horizontally and supporting the corresponding fastening member or members and said second wing portion extending substantially vertically between said upper part and said lower part of said housing.

11. A mower according to claim 10, wherein to each guiding and driving bearing are associated two brackets, each of which extends approximately parallel to said longitudinal axis of said housing and wherein said first wing portion supports two fastening members extends in the vicinity of said corresponding second gear and includes a recessed portion so as to avoid interference with said second gear.

12. A mower according to claim 11, wherein said recessed portion is partly circular in shape and has a radius slightly larger than a radius of said second gear.

13. A mower according to claim 1, wherein each one of said fastening members has a groove formed therein and within which a seal means is mounted, and wherein the casing of a corresponding guiding and driving bearing has a passage hole formed therein through which said threaded upper portion of said fastening member passes, said passage hole including a beveled portion such that upon mounting of said casing on said upper part of said housing, said seal means occupies a space formed between said groove and said beveled portion.

14. A mower according to claim 13, wherein said groove is of a semicircular shape and said seal means comprises an O-ring.

15. A mower according to claim 1, wherein said fastening part for fastening a corresponding one of said cutting elements has at least one recessed part permitting access from above to each nut of the corresponding assembly elements for tightening and loosening of each nut.

16. A mower according to claim 15, wherein each fastening part has a plurality of recessed parts corresponding in number to a number of said nuts fastening said corresponding guiding and driving bearing to the upper part of said housing.

17. A mower according to claim 15, wherein said recessed part comprises a flat surface member.

18. A cutting bar adapted to equip a mower, said cutting bar comprising:
an elongate housing having a longitudinal axis and being adapted in a work position during use of said mower to extend close to a field surface so that said longitudinal axis extends transversely to a working direction during use of said mower, said housing when in said work position having an upper part and a lower part, said upper part including a plurality of bores formed therein, said housing containing a plurality of first gears therein;
a plurality of guiding and driving bearings, each one of which comprises a casing centered in a corresponding one of said bores in said upper part of said housing, a guiding bearing mounted in said casing, a shaft guided in said casing via said guiding bearing, a fastening part for fastening a cutting element, said fastening part being connected to an upper end of said shaft, and a second gear connected to a lower end of said shaft, said second gear extending in said housing and meshing with at least a corresponding one of said first gears positioned in said housing, said second gear having an outside diameter less than a diameter of said corresponding bore formed in the upper part of said housing; and
assembly elements for removably fastening said guiding and driving bearings to said upper part of said housing, said assembly elements including a plurality of fastening members each of which having a threaded upper portion extending when said housing is in said work position above said upper part of said housing and a lower portion extending entirely in said housing, a plurality of nuts, each of which being screwed on said threaded upper portion of the corresponding one of said fastening members, and one or several holding elements extending entirely within said housing and to which are fastened said fastening members by their corresponding lower portion for holding each one of said fastening members in position and for preventing rotation of each one of said fastening members during tightening or loosening of the corresponding nut, said one holding element or said several holding elements and said fastening members fastened thereto being removable from said housing.

19. A cutting bar according to claim 18, wherein each one of said fastening members comprises a bolt.

20. A cutting bar according to claim 18, wherein said holding element or each one of said several holding elements holds the corresponding fastening member or members in position after mounting of said lower part of said housing to said upper part of said housing.

21. A cutting bar according to claim 20, wherein a height dimension of said holding element or of each of said several holding elements is approximately equal to an inside thickness dimension of said housing.

22. A cutting bar according to claim 18, wherein each of said fastening members is respectively fastened by welding to said holding element or to the corresponding one of said several holding elements.

23. A cutting bar according to claim 18, wherein said holding element or each of said several holding elements extends to a position in the vicinity of at least one of said second gears and includes a recessed portion so as to avoid interference with said second gear.

24. A cutting bar according to claim 23, wherein said recessed portion comprises at least one portion partly circular in shape which has a radius slightly larger than a radius of said second gear.

25. A cutting bar according to claim 18, wherein each of said several holding elements supports two fastening members and wherein two holding elements are associated to each guiding and driving bearing.

26. A cutting bar according to claim 18, wherein said holding element or each of said several holding elements extends approximately parallel to said longitudinal axis of said housing.

27. A cutting bar according to claim 18, wherein each of said holding elements comprises a bracket having a first and second wing portion, said first wing portion during use of said mower when said housing extends close to a field surface, extending substantially horizontally and supporting the corresponding fastening member or members and said second wing portion extending substantially vertically between said upper part and said lower part of said housing.

28. A cutting bar according to claim 27, wherein to each guiding and driving bearing are associated two brackets, each of which extends approximately parallel to said longitudinal axis of said housing and wherein said first wing portion supports two fastening members, extends in the vicinity of said corresponding second gear and includes a recessed portion so as to avoid interference with said second gear.

29. A cutting bar according to claim 28, wherein said recessed portion is partly circular in shape and has a radius slightly larger than a radius of said second gear.

30. A cutting bar according to claim 18, wherein each one of said fastening members has a groove formed therein and within which a seal means is mounted, and wherein the casing of a corresponding guiding and driving bearing has a passage hole formed therein through which said threaded upper portion of said fastening member passes, said passage hole including a beveled portion so that upon mounting of said casing on said upper part of said housing, said seal means occupies a space formed between said groove and said beveled portion.

31. A cutting bar according to claim 30, wherein said groove is of a semicircular shape and said seal means is an O-ring.

32. A cutting bar according to claim 18, wherein said fastening part for fastening a cutting element has at least one recessed part permitting access from above to each nut of the corresponding assembly elements for tightening and loosening of each nut.

33. A cutting bar according to claim 32, wherein each fastening part has a plurality of recessed parts corresponding in number to a number of said nuts fastening said corresponding guiding and driving bearing to the upper part of said housing.

34. A cutting bar according to claim 32, wherein said recessed part comprises a flat surface member.

* * * * *